March 18, 1930.  G. W. LANGE ET AL  1,751,338

MACHINE FOR MAKING HORSESHOE NAILS

Filed Nov. 18, 1922  6 Sheets-Sheet 3

Inventors,
Gustav W. Lange,
Gustav M. Lange,
by Geyer Popp
Attorneys.

March 18, 1930.  G. W. LANGE ET AL  1,751,338
MACHINE FOR MAKING HORSESHOE NAILS
Filed Nov. 18, 1922   6 Sheets-Sheet 4

March 18, 1930. G. W. LANGE ET AL 1,751,338
MACHINE FOR MAKING HORSESHOE NAILS
Filed Nov. 18, 1922  6 Sheets-Sheet 6

Inventors,
Gustav W. Lange
Gustav M. Lange
by Geyer & Popp
Attorneys.

Patented Mar. 18, 1930

1,751,338

UNITED STATES PATENT OFFICE

GUSTAV W. LANGE AND GUSTAV M. LANGE, OF BUFFALO, NEW YORK, ASSIGNORS TO THE FOWLER AND UNION HORSE NAIL CO., INC., OF TONAWANDA TOWNSHIP, NEW YORK, A CORPORATION OF CONNECTICUT

MACHINE FOR MAKING HORSESHOE NAILS

Application filed November 18, 1922. Serial No. 601,702.

This invention relates to a machine for making horseshoe nails and is of the type in which the nails are blanked, properly shaped and finished from a supply or reel of nail-wire fed into the machine.

Its principal object is to provide an improved machine of this character which is automatic and reliable in operation and which permits of expeditiously making nails with a minimum expenditure of power and labor.

Another object of the invention is to produce a machine which is simple and compact in construction and to improve various details of its construction with a view of producing a more efficient machine, as will be hereinafter described and more particularly pointed out in the appended claims.

In the accompanying drawings.

Similar characters of reference indicate corresponding parts throughout the several views.

In its general organization, this machine comprises a mechanism for shaping the nail-blanks, a mechanism for heading the nails, conveying mechanism for delivering the nail blanks from the blanking mechanism to the heading mechanism, mechanism for pointing and finishing the nails, and means for transferring and conveying the nails from the heading mechanism to the pointing and finishing mechanism.

The frame on which the working parts of the machine are mounted may be of any suitable construction, that shown in the drawing, by way of example, consisting of a bed or table 20 for supporting the nail heading, pointing and finishing mechanism, and a series of uprights or standards 21 mounted on said table for supporting the nail-blanking mechanism.

This nail-blanking mechanism may be of any suitable and well known construction, but as shown in the drawings, is preferably constructed as follows:

22 represents a reel freely mounted at the upper end of the foremost standard 21 upon which is coiled a supply of nail rod from which the nail-blanks are formed. The nail rod is pulled or forced downwardly from the supply reel between a pair of driven feed rolls 23 and located below the latter is an appropriate cutter mechanism including a stationary cutter 24 and a movable cutter 25 for intermittently severing a blank of predetermined length from the nail rod as it is fed through the machine.

Figures 1, 11, 12, 13:
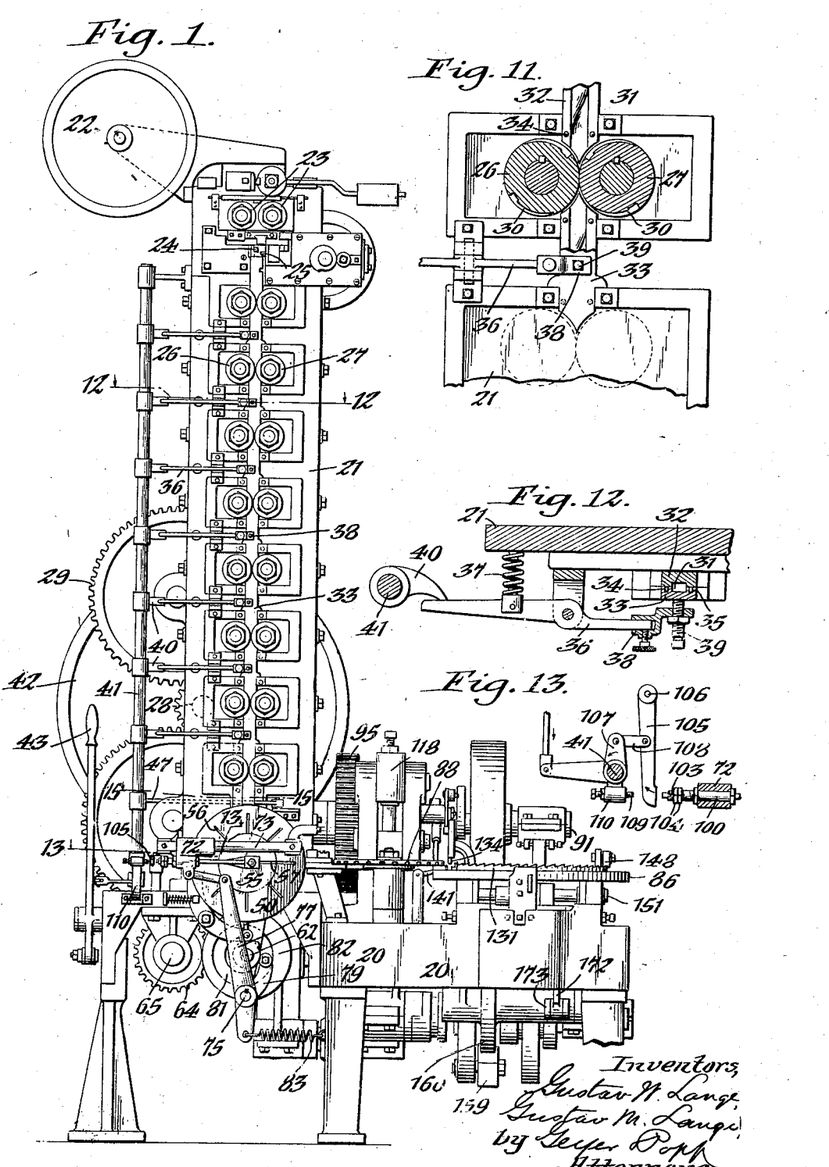
Figure 1 is a front view of a horse nail machine embodying our improvements.
Figure 11 is an enlarged fragmentary sectional elevation of a set of the nail blank shaping rollers and adjacent parts.
Figure 12 is an enlarged horizontal section on line 12—12, Fig. 1.
Figure 13 is an enlarged horizontal section on line 13—13, Fig. 1.

The operation of forming the severed blank into the required shape preparatory to heading and pointing the same is performed by passing the blank through a series of roller dies 26, 27, suitably journaled in the foremost standard 21 and driven from the drive shaft 28 of the machine through the medium of a train of gearing 29. Each pair of roller dies contains a matrix 30 of the required form for successively shaping the nail blank as it passes from the uppermost to the lowermost set of dies. Disposed between each successive pair of roller dies is a guideway 31 for conducting the nail blanks from one set of dies to the other. Each guideway is formed between two blocks or sections 32, 33, the former of which is attached to the front side of the foremost standard 21 while the latter section 33 is detachably secured to said section 32 by dowel pins 34 and corresponding openings 35. The outer or removable section 33 of each guideway is yieldingly held against its companion inner section by a horizontally-swinging lever 36 fulcrumed intermediate its ends to the standard 21, a spring 37 applied to the outer arm of said lever normally resisting movement of the latter away from said outer block section. As shown in Fig. 11, the guideways 31 are preferably of spiral-like form so that the nail blanks are presented alternately flatwise and edgewise as they pass successively between the several sets of roller dies. The inner arm of each lever 36 is provided with a removable extension or coupling 38 to which is applied an adjusting screw 39, said coupling being adapted to normally abut against the outer guideway section 33, as shown in Figs. 11 and 12. Co-operating with the outer arms of the several levers 36 are tappets 40 which are mounted on an upright rock shaft 41 operatively connected to the clutch 42 of the machine through the medium of any suitable and well known mechanism. Inasmuch as this mechanism forms no part of the present invention, it has not been deemed necessary to go into its detailed construction. Should any of the guide passages 31 become accidentally clogged with the nail blanks while the machine is in operation, the outer section 33 of the clogged guide passage will be forced outwardly and cause the corresponding lever 36 to rock the shaft 41 and in turn release the clutch to stop the machine, after which the operator can clean out the passage in question by simply detaching the coupling 38 and removing said outer section 33, so as to expose the passage. An operating lever 43 is also provided for engaging the clutch to start the machine and for releasing the clutch to stop it at the will of the operator.

Figures 3, 14, 15:
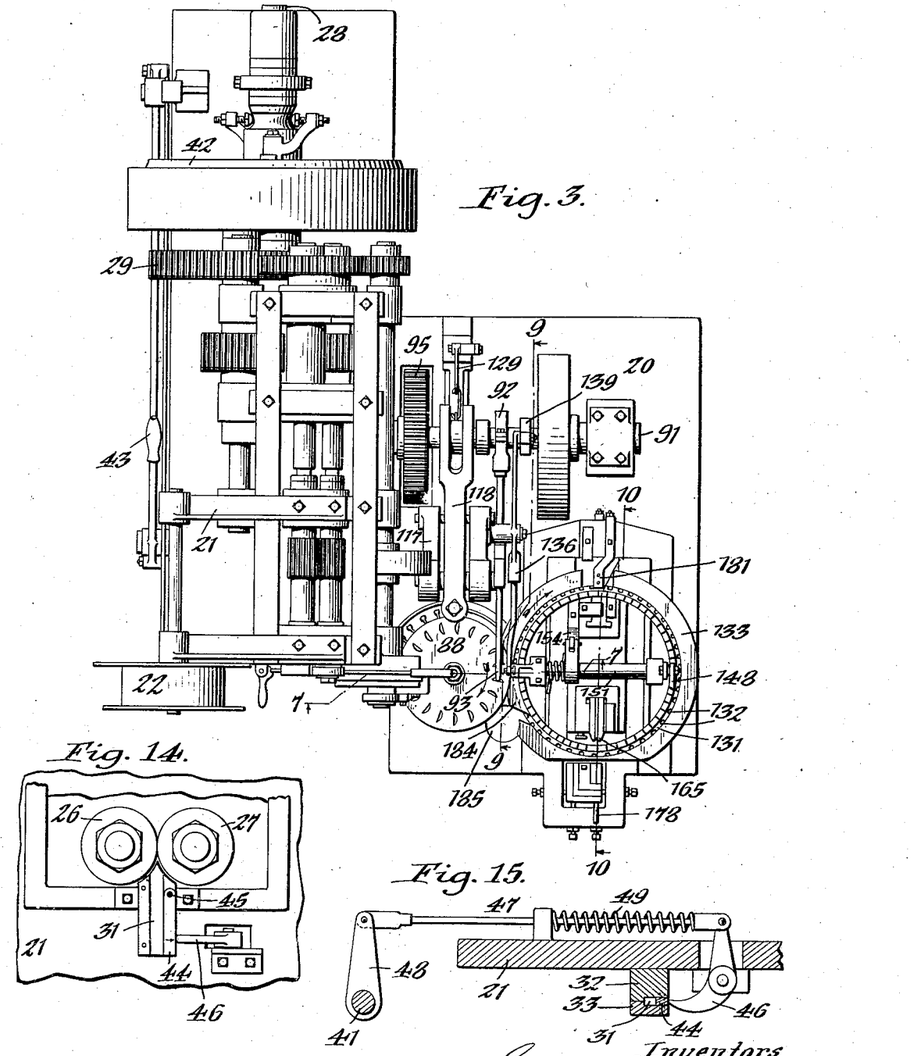
Figure 3 is a top plan view thereof.
Figure 14 is an enlarged fragmentary front view of the lowermost nail-blank passage and associated parts.
Figure 15 is an enlarged horizontal section on line 15—15, Fig. 1.

The final or lowermost guide passage 31 is provided with a movable side wall 44 which is operatively connected to the rock shaft 41 so as to release the clutch should a bad or imperfect nail blank enter said passage. In the preferred construction shown in Figs. 14 and 15, this movable side wall is pivoted at 45 to swing laterally between the corresponding guide sections 32, 33. One arm of a horizontally-swinging bell crank lever 46 abuts against the outer edge of said movable wall while the other arm thereof is connected by a link 47 with an arm 48 mounted on the rock shaft 41. A coil spring 49 applied to said link yieldingly resists movement of the bell crank lever and the side wall 44 out of their normal positions.

After being operated upon by the roller dies 26, 27, the nail-blanks are delivered to the heading device by a conveying mechanism which is preferably constructed as follows:

50 represents a turn plate or revolving carrier which is located axially in line and below the lowermost guideway 31 of the nail blanking mechanism, so as to receive the nail-blanks therefrom in a substantially vertical position and carry them around to a substantially horizontal position, at which time they are ejected onto another revolving carrier which presents them to the heading mechanism. This turn plate is rotated intermittently and is in the form of a ring secured to the front face of a wheel 51 having a rearwardly extending sleeve 52 journaled on a horizontal arbor 53 suitably supported at its rear end in a bracket 54. The front end of this arbor is provided with a circular head 55 which fits within the turn plate opening and about which said plate revolves. Disposed radially of the turn plate are a series of slots 56 which extend the full width of the plate and each of which is adapted to receive a nail-blank head first from the last guideway 31 of the blanking mechanism. As the plate 50 revolves, these slots are adapted to successively register with a horizontal slot or guideway 57 formed in the head 55 and in which a reciprocating push rod or plunger 58 is arranged for ejecting the nails from the slots 56. Intermittent motion is transmitted to the turn plate through the medium of a Geneva movement including the star wheel 59 fixed on the sleeve 53 and the operating roller 60 carried by a disk 61 mounted on a driven shaft 62 journaled in suitable bearings carried by the frame bed 20 of the machine. Said shaft 62 is provided with a gear 63 which meshes with a gear 64 mounted on a countershaft 65 geared to the main drive shaft 28 of the machine.

In order to positively arrest the movement of the turn plate 50 at the moment any one of its slots 56 registers with the head slot 57 to allow the plunger to eject the nail-blanks therefrom, the periphery of the wheel 51 is provided with a series of radial notches 66 with which a locking pawl 67 is adapted to interlock. This pawl is fulcrumed at 68 and its lower arm carries a roller 69 arranged to engage a cam 70 mounted on the shaft 62. This cam is properly timed with the Geneva movement so that the pawl is released from the notched wheel 51 during the intervals of movement of the turn plate. A coil spring 71 applied to the locking pawl normally serves to resist movement of the same out of its interlocked position.

The means for reciprocating the nail ejecting plunger 58 while the turn plate is at rest are preferably constructed as follows:

72 represents a horizontally movable cross head guided on a supporting bar 73 and operatively connected to the ejecting plunger by a rod 74. Fixed on the front end of a rock shaft 75 journaled in a bearing bracket 76 is a rock lever 77 whose upper end is connected with the cross head by a link 78. An actuating lever 79 is fixed on the other end of said rock shaft and its upper arm is provided with a roller 80 which engages a cam groove 81 formed in the face of a revolving disk 82 mounted on the driven shaft 62. As the cam groove disk revolves, the lever 77 is rocked back and forth to impart a corresponding reciprocating movement to the plunger 58 to successively eject the nail-blanks from the several slots in the turn plate. It will be understood that the cam groove is so timed that the effective stroke of the plunger starts the moment one of the nail slots 56 comes into register with the slot 57 of the head 55 and its return stroke is also effected while the turn plate is at rest. The lower arm of the actuating lever 79 may be provided with a coil spring 83 for insuring the prompt return of said lever and associated parts.

Figure 7:
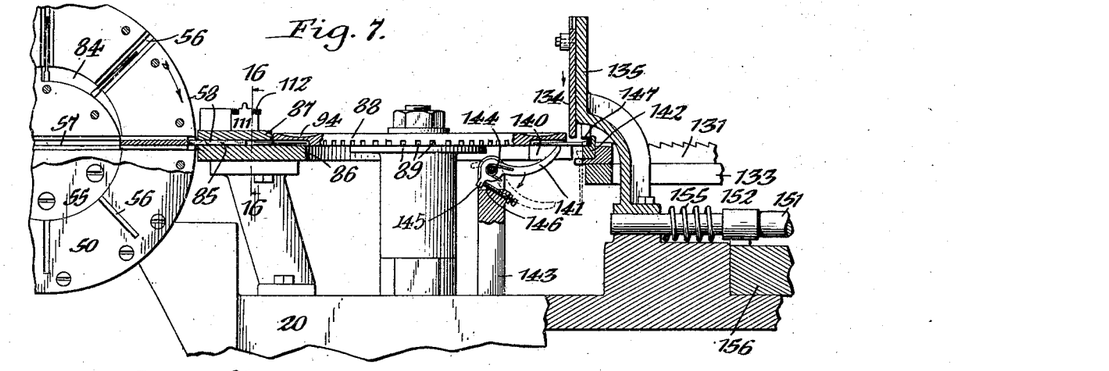
Figure 7 is an enlarged transverse vertical section taken in the plane of line 7—7, Fig. 3.

The stationary head 55 is provided in its top and adjoining side with a peripheral eccentric groove or recess 84, as shown in Fig. 7, with which the lower ends of the turn plate slots 56 are adapted to communicate. When a nail-blank drops by gravity into one of these slots from the roller die mechanism, its head end rests on the bottom of the groove 84 and as the turn plate revolves about the head 55, the nail-blank is gradually pushed outwardly until it reaches its horizontal position, when the blank is ready to be completely ejected therefrom by the plunger 58 the moment the turn plate comes to rest. By the provision of the eccentric groove 84, the nail receiving slots 56 in the turn plate are temporarily increased in length at the point of discharge of the nail blanks from the roller die mechanism, this additional length of said slots being for the purpose of compensating for the rebound of the nails as they strike the bottom of said groove, whereby they are prevented from jumping beyond the periphery of the turn plate.

Figure 2:
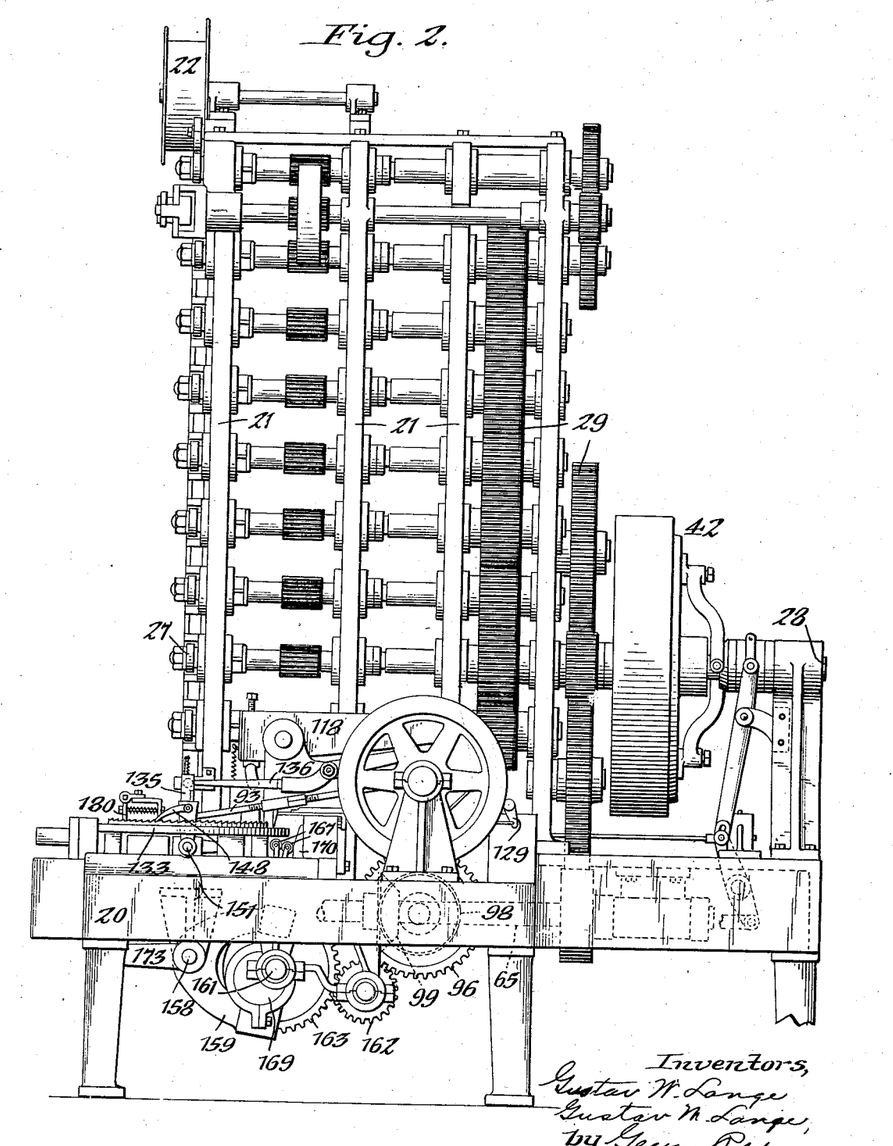
Figure 2 is a side elevation thereof.
Figure 9:
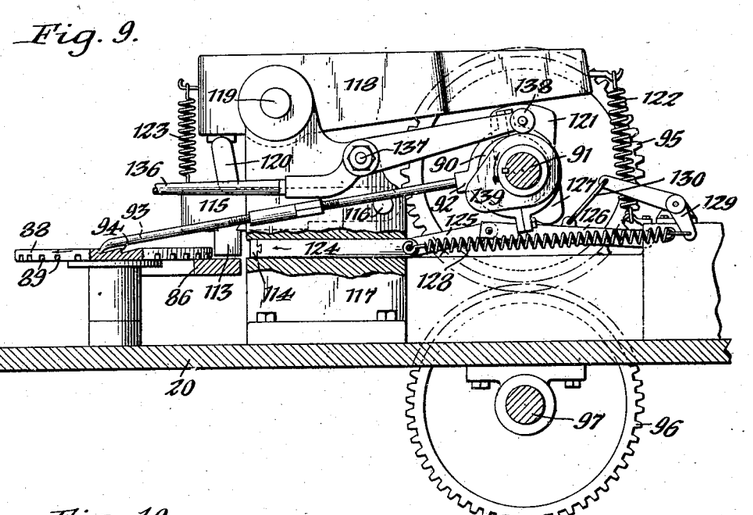
Figures 9 and 10 are enlarged vertical longitudinal sections on the correspondingly numbered lines in Fig. 3.

From the slots in the turn plate, the nail blanks are ejected point foremost into an alining horizontal guide-channel 85 preferably formed between a bottom ring or plate 86 suitably supported on the table 20 of the machine and a removable top plate 87, as shown in Fig. 7. A revolving horizontal carrier 88 is mounted on the table with its outer edge overhanging the bottom plate 86 and its underside is provided with a series of radial grooves 89 for successively receiving the nail blanks as they are projected through the channel 85. This carrier is revolved intermittently in a clockwise direction and conveys the nail-blanks to the die and punch mechanism for properly shaping the head and then to a transfer point where the nails are discharged onto another carrier for presenting the nails to the pointing and finishing mechanism. As the nails are propelled by the carrier 88, they rest flatwise substantially their full length on the annular plate 86. Any appropriate means may be employed for imparting rotary motion to this carrier, but as shown in the drawings, the preferred means comprise an eccentric 90 mounted on a transverse shaft 91, and a strap 92 surrounding said eccentric and provided with a reciprocating feed bar 93 arranged to engage an annular row of teeth or notches 94 formed in the upper side of the carrier. The shaft 91 is provided with a gear 95 which meshes with a gear 96 on a parallel shaft 97 driven from the countershaft 65 through the medium of bevel gears 98, 99, as shown in Figs. 2 and 9.

Figure 4:
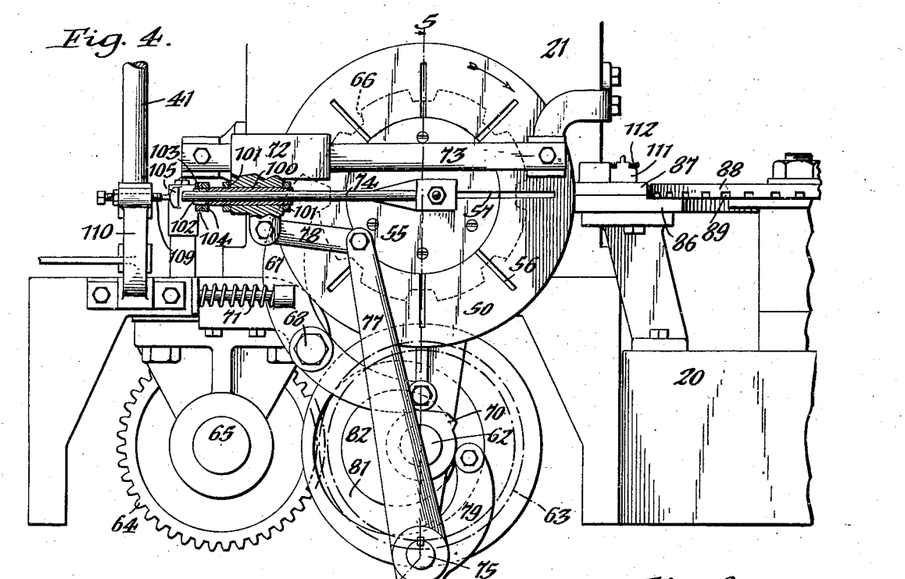
Figure 4 is an enlarged fragmentary sectional front view of the lower part of the machine, showing the feed mechanism for delivering the nail blanks from the blanking mechanism to the heading mechanism.
Figure 5:
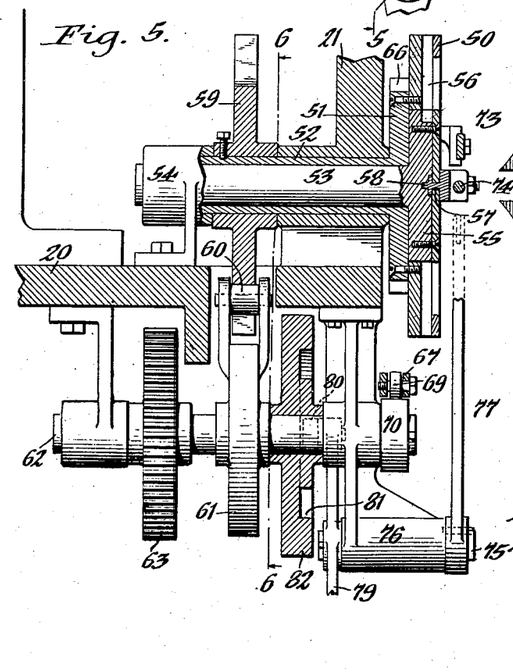
Figure 5 is a vertical section on line 5—5, Fig. 4.
Figure 6:
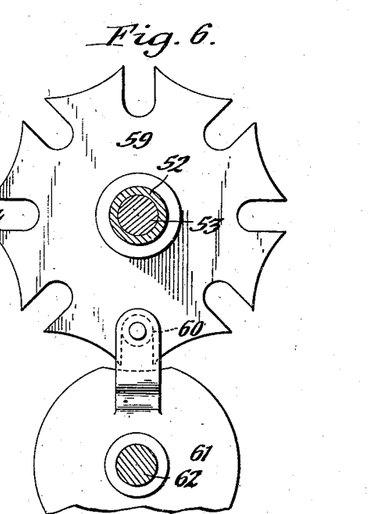
Figure 6 is a transverse vertical section on line 6—6, Fig. 5.

The plunger rod 74 is so connected with the cross-head 72 that it is permitted to slide independently thereof should said plunger on its forward or effective stroke encounter an abnormal resistance, such for instance, as a bent nail or other obstruction which has become clogged in one of the turn plate slots 56 or in the channel 85 leading to the carrier 88. For this purpose, as shown in Fig. 4, the rear end of the plunger rod passes through a bushing 100 held firmly against longitudinal displacement relative to the cross-head by lock nuts 101. The rear portion of this bushing extends a suitable distance beyond the adjacent end of the cross-head and is provided with a tapered threaded end 102 having longitudinal slits 103. Applied to said threaded end are lock nuts 104 for tightening or compressing the bushing about the plunger rod to enable the latter to move with the cross-head during the normal working of the machine. By this arrangement, the plunger is caused to normally move with the cross-head, but should it encounter an abnormal resistance the same will slide rearwardly in its bushing relatively to said cross-head.

It is desirable under the last-named condition to provide means controlled by the plunger-rod for automatically releasing the clutch to stop the machine and thereby prevent any damage which might result if the machine continues in operation. To this end, a horizontally-swinging lever 105 fulcrumed at 106 to the table 20 of the machine is arranged in the path of movement of the plunger rod and is operatively connected to the clutch-controlling rock shaft 41. Fixed to the latter is an arm 107 connected to the lever 105 by a link 108. To limit the swinging movement of the actuating lever, a stop in the form of an adjusting screw 109 is employed, which may be mounted in a bracket 110 or other adjacent fixed part of the frame. Thus, should the plunger strike an obstruction during its forward stroke, its connecting rod will slide rearwardly in the cross-head 72 and be projected an appreciable distance beyond the end of the bushing 100, so that on the return stroke of these parts said rod will strike the lever 105 and rock the shaft 41 to release the clutch 42 and stop the machine. The swinging movement of the lever 105 is arrested by the stop screw before the completion of the rearward stroke of the cross-head which causes the latter to slide on the connecting rod and again be automatically reset in its initial operative position preparatory to the beginning of the forward stroke.

Figures 16, 17:
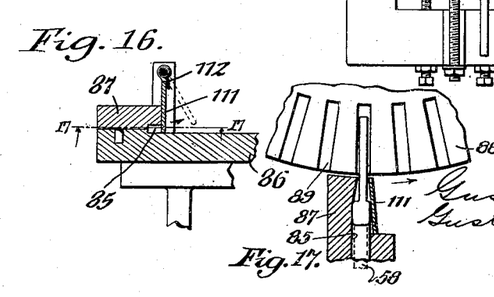
Figure 16 is an enlarged vertical section on line 16—16, Fig. 7.
Figure 17 is an enlarged horizontal section on line 17—17, Fig. 16.

As shown in Figs. 7, 16 and 17 the rear wall of the channel 85 is provided with a laterally-swinging gate 111 hinged at its upper end and having a spring 112 applied thereto for yieldingly holding the same in its normally closed position. As shown in Fig. 17, the gate 111 and the opposing wall of the guide channel 85 preferably converge forwardly to form a contracted mouth which promptly directs the nail blank into the waiting groove 89 in the carrier 88 and which also prevents said blank being projected beyond a predetermined point by reason of its head frictionally engaging the tapering portions of said channel, thereby properly positioning the blanks to be acted on by the heading dies, hereinafter described. When a nail-blank is discharged through said channel into the intermittently-revolving carrier 88, the projecting head end of the blank as the carrier revolves a step, encounters the hinged gate and opens it to the position shown by dotted lines in Fig. 16, after which said gate again closes preparatory to the next nail-blank being ejected through the channel into the awaiting groove in the carrier 88.

The nail heading mechanism is preferably located substantially 90 degrees from the point where the nail-blanks are discharged from the turn plate 51, to the rotatable carrier 88 and the same is preferably constructed as follows:

113 and 114 represent, respectively, a vertically movable die and a horizontally movable die for shaping the side and top of the nail head. The die 113 is mounted on the front end of a vertically-swinging arm 115 fulcrumed at 116 to the rear end of a bracket 117 secured to the table 20 of the machine and actuated by a rock lever 118 fulcrumed at 119 to the upper end of said bracket, a pivot or coupling bar 120 being interposed between the opposing sides of said arm and said rock lever, as shown in Fig. 9. Co-operating with the bifurcated rear end of the rock lever is a pair of cams 121 which are mounted on the shaft 91 and which are adapted to rock said lever downward on its effective stroke while a spring 122 applied to the rear end of this lever effects its return or upward stroke. The corresponding front ends of the rock lever and the die supporting arm 115 may be yieldingly connected by a coil spring 123 to insure the prompt release of said arm as soon as the rock lever is moved upwardly.

The heading die 114 is mounted at the front end of a horizontally-reciprocating bar 124 which is guided in the bracket 117 and actuated by a pair of toggle levers 125, 126 pivotally connected at their opposing ends while the free end of the toggle lever 125 is pivoted to the rear end of said reciprocating bar and the corresponding end of the toggle lever 126 is pivoted to the adjacent portion of the machine frame, as shown in Fig. 9. A cam 127 mounted on the shaft 91 is arranged to engage this toggle connection to expand the same and force the die bar 124 against the nail head to shape its top. The return stroke of this bar is effected by a spring 128 connected at one end to the rear end of said bar and at its other end to one arm of a bell crank lever 129, the other arm of the latter being connected by a link 130 with the toggle lever 126, as shown in Fig. 9. It will be understood that the feeding mechanism of the carrier 88 and the actuating mechanism of the heading dies are properly timed so that when the carrier is at rest said dies are actuated the die 114 coming into operation immediately after the operative stroke of the die 113.

Figure 10:
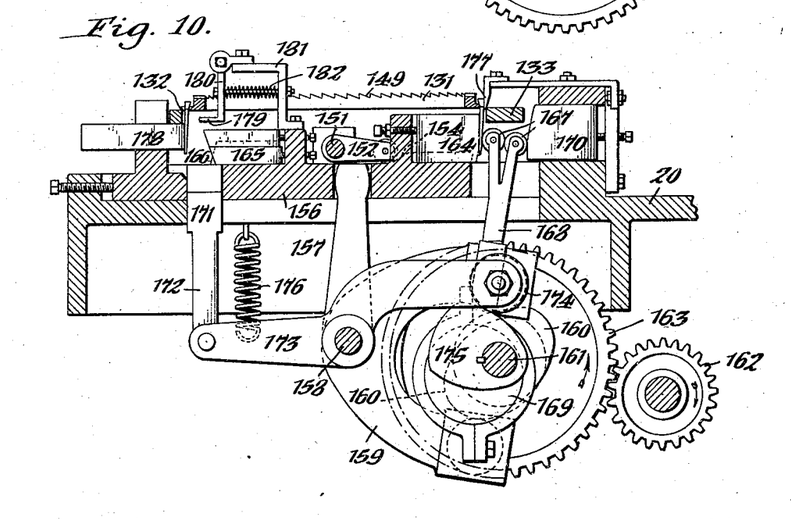

After the nail-blanks are successively presented to the heading dies they are propelled by the carrier 88 an additional 90 degrees to a point where they are automatically transferred from their horizontal position to a vertical or pendant position. For this purpose, an intermittently rotating ring 131 is employed for receiving the nails and propelling them in a pendant position with the points down to the pointing and finishing dies, said ring being provided in its periphery with a series of radial notches 132 in which the nails are supported with their heads projecting above them, as shown in Fig. 10. Surrounding this carrier-ring is a guard ring 133 suitably supported on the table 20.

Figure 18:
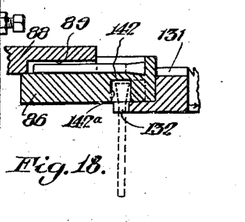
Figure 18 is an enlarged vertical section on line 18—18, Fig. 8.

The means for transferring the nail-blanks from the carrier 88 to the ring 131 consists of a vertically-movable transfer bar 134 guided for movement in a bracket 135 and reciprocated by a rock lever 136 fulcrumed at 137 to the bracket 117. The front arm of this lever is pivoted to the transfer bar while its other arm carries a roller 138 which contacts with a cam 139 mounted on the shaft 91. The bottom ring 86, which supports the nails in a horizontal position while being propelled by the carrier 88, is provided with a vertical opening 140 arranged opposite and in line with the transfer bar and of the proper length and width to permit a nail to drop through it. Extending upwardly into this opening is a vertically-swinging finger 141 which is adapted to support the shank of the nail approximately midway of its length, when it registers with said opening, while the head of the nail is supported on a stationary rest or support 142, which forms a continuation of the fixed ring 86 and which overhangs the notched portion of the ring 131, as shown in Figs. 7 and 18. The supporting finger 141 is fulcrumed at the upper end of a post 143 fastened to the table 20 of the machine and disposed below the carrier 88. A coil spring 144 surrounding the fulcrum pin of this finger and attached at one end to the latter and at its other end to said post tends to resist movement of the finger out of its normal operative position shown by full lines in Fig. 7. The hub of the finger is provided with a stop lug 145 which is arranged to normally abut against an adjustable stop 146, the latter being preferably in the form of a screw or bolt carried by the post 143. As the nail-blanks propelled by the carrier 88 come successively into register with the opening 140 in the bottom ring 86, the transfer bar 134 moves downwardly in the path of the nail and forces it into a pendant position with its head supported in one of the notches 132 of the rotating ring 131, as shown by dotted lines in Fig. 7. A leaf spring 147 fastened at one end to the bracket 135 or other adjacent part is arranged to overhang the nail head at the transfer point and prevent the nail from accidentally jumping out of its proper position during the downstroke of the transfer bar. That portion of the nail-supporting ring 86 which overhangs the notched outer edge of the nail carrier 131 adjacent the transfer bar 134 is provided in its underside with an arcuate groove or passage 142ª through which the heads of the nails may freely pass after being transferred from the horizontal to the pendant position shown by dotted lines in Figs. 7 and 18.

The ring carrier 131 is intermittently rotated in a clockwise direction or in the same direction as the carriage 88 to present the nails to the pointing and finishing dies by a feed pawl 148 meshing with ratchet teeth 149 on the ring carrier and mounted on an arm 150 secured to one end of a horizontal rock shaft 151 journaled at its ends in suitable bearings carried by the top of the table 20 of the machine. The rock shaft is actuated by a rock arm 152 fastened thereto and provided at its free end with a roller 153 adapted to ride upon an incline 154 whereby said arm is rocked upwardly, a coil spring 155 being provided for rocking the same in the opposite direction.

156 represents a slide plate or carriage supported on the table 20 of the machine beneath the ring-carrier 131 and reciprocated lengthwise thereof by a lever 157 loosely mounted on a transverse shaft 158 suitably supported below said table. Cast integral with this lever is an elbow lever 159 which co-operates with a set of cams 160 mounted on a horizontal shaft 161 driven from the shaft 97 through the medium of the gear 96 and an idler gear 162 which meshes with a gear 163 on said shaft 161. The cams 160 are so timed that one serves to actuate the slide 156 in one direction while the other moves it in the opposite direction.

The rear end of the slide plate carries a die block or anvil 164 against which the nails are rolled preparatory to pointing, while the front end of said plate is provided with a pointing-die 165 and a beveling die 166. The rolling devices which co-operate with the anvil 164 consist of a pair of rollers 167 arranged at the upper end of a forked lever 168 mounted on an eccentric 169 fixed on the shaft 161, whereby said rollers are reciprocated vertically between the anvil and an abutment block 170, the nail being interposed between said anvil and the roller during the rolling operation, as shown in Fig. 10. During such operation, the slide plate 156 is moved firmly against a block 171, which at a predetermined point in the rearward stroke of this plate is interposed between the front end of the slide plate and the frame of the machine. Said block 171 is formed at the upper end of a vertically-reciprocating bar 172 pivoted at its lower end to one arm of a rock lever 173 fulcrumed intermediate its ends on the shaft 158, while the other arm of said lever carries a roller 174 which contacts with a cam 175 mounted on the driven shaft 161. This cam serves to actuate the rock lever to lower the block 171 while a spring 176 acts to raise said block into its operative position.

To hold the nails from displacement during the rolling operation a presser 177 is provided which rests against the head of the nail as it is brought into the open space occupied by the rollers 167, as shown in Fig. 10.

After the rolling operation, the slide plate 156 is reciprocated to the opposite side of the ring-carrier 131 where the nails successively come in contact with the pointing or shearing die 165 and the finishing or beveling die 166. The pointing die may be of any well known construction and co-operates with a punch 178 against which the nail strikes when the pointing die is forced against it, the shape of the punch conforming to the point of the nail. To properly position the nail preparatory to the shearing operation, a centering device 179 is arranged at the lower end of a swinging arm 180 pivoted to a supporting bracket 181 secured to the slide plate. A spring 182 tends constantly to force the centering device toward the nail. The point of the centering device comes in contact with the nail shortly in advance of the shearing die and as the slide plate moves toward the punch 178, said centering device yields rearwardly to the extent required. Upon the completion of the pointing operation, the nails are presented between the beveling-die 166 carried by the slide plate and an opposing stationary die 183, whereby the points of the nails are properly beveled, this operation completing the nails to a finished state.

The removal of the nails from the notches in the ring-carrier 131 is effected by a deflector plate 184 located above the plane of the carrier and in the path of the nail heads between the beveling dies and the transfer point where the nails are discharged from the carrier 88 onto said ring-carrier. As the nails approach this deflector, their heads which project above the notched portion of the carrier, encounter the receding edge of said deflector, thereby successively withdrawing the nails from the ring notches 132 from which they drop by gravity through a discharge opening 185 formed in the table 20 of the machine.

Figure 8:
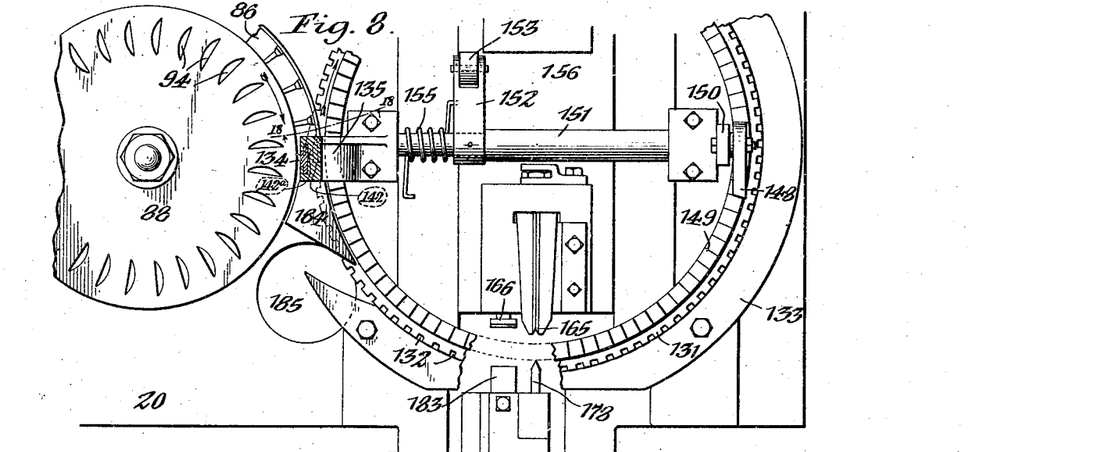
Figure 8 is an enlarged fragmentary top plan view of the right hand side of the machine, showing parts of the nail feeding and finishing mechanism.

As shown in Fig. 8, the guard ring 133 which surrounds the ring carrier terminates short of the deflector to form a passage for the nails as they are withdrawn from said carrier.

Briefly described, the operation of the machine is as follows:

The nail-blanks severed from the nail-rod or wire by the cutter 24 are first passed successively through the series of roller dies 26, 27 for shaping the blanks. Upon emerging from the lowermost set of rollers, the blanks enter the slots of the intermittently-moving turn table 50 which carries them from a vertical to a horizontal position. While in the latter position, the blanks are successively pushed by the plunger 58 through the channel 85 into the grooves of the intermittently rotating carrier 88 which delivers them in a horizontal position to the pair of heading dies 113, 114 which properly shape their heads. Thence the headed nail-blanks are conveyed by the carrier 88 to a point opposite the transfer devices 134, 142 which deliver the blanks in a pendent position to the third intermittently rotating carrier 131 which conveys and presents them to the anvil 164 and the rollers 167 for rolling the blanks, and then presents them successively to the pointing or shearing dies 165 and 178 and the finishing or beveling dies 166 and 183, thus completing the nails which are discharged from the carrier 131 by the deflector 184 and dropped through the opening 185 of the latter into a suitable receptacle.

We claim as our invention:

1. In a horse-nail machine, means for carrying and controlling nail-blanks, including a disk, a turn-plate concentric with said disk and rotatably mounted thereon, the edge of said disk being partly eccentric forming a tapering space between the adjacent edges of the disk and the plate, said plate having radial slots for the nail blanks which extend to its inner edge, means for actuating said plate, and means for ejecting the nail-blanks from said slots.

2. A horse-nail machine, comprising means for shaping the nail-blanks, and means for receiving the nail blanks from said shaping means including a stationary disk, a turn plate concentric with said disk and rotatably mounted thereon, the edge of said disk being partly eccentric forming a tapering space between the adjacent edges of the disk and the plate, said plate having radial slots for receiving the nail-blanks which extend to the inner edge of said plate, means for revolving said plate intermittently, and a reciprocating plunger guided on said disk and arranged to register with the slots in the turn plate for ejecting the nail-blanks therefrom.

3. A horse-nail machine, comprising means for shaping the nail-blanks, and means for receiving the nail blanks from said shaping means including a stationary disk having a peripheral eccentric portion extending substantially a quarter of its circumference, a turn plate concentric with said disk and rotatably mounted thereon, said plate having radial nail-receiving slots extending to the inner edge of said disk, and a reciprocating plunger guided on said disk and arranged to register with the slots in the turn plate for ejecting the nail-blanks therefrom.

4. A horse-nail machine, comprising a turn plate having radial slots for receiving nail-blanks, a fixed guide extending across said turn table, a head sliding on said guide, a bushing carried by said head and arranged parallel with said guide, a plunger arranged to eject the nail blanks from said slots and having a rod arranged in said bushing, and means for frictionally clamping said rod in the bushing to normally reciprocate the plunger with said head, while allowing the rod to slip in the bushing when the plunger encounters abnormal resistance.

5. In a horse-nail machine, the combination of a pair of intermittently-revolving carriers, one of said carriers being adapted to propel the nail-blanks in a horizontal position while the other is adapted to propel the nails in a pendent position, and means for transferring the nails from said first-named carrier to the other including a yieldable member located at the transfer point for supporting the shank of the nail, a fixed support for the head of the nail, a yieldable head retaining device disposed above said fixed support, and a vertically reciprocating transfer bar located between said fixed support and said yieldable support.

6. In a horse-nail machine, the combination of a rotary carrier for propelling the nail blanks in a horizontal position, a second carrier for propelling them in a pendent position, a fixed plate underneath the first-named carrier having a portion which overlaps the rim of the second-named carrier and forms a rest for the heads of the blanks while in a horizontal position, said plate being provided in its underside with an arcuate groove for the passage of the heads while the blanks occupy a pendent position, and means for transferring the blanks from the first to the second-named carrier.

7. In a horse-nail machine, the combination of a rotary carrier having radial slots to receive nail blanks, a second rotary carrier having radial grooves for the blanks, a guide-channel for the blanks leading from the first to the second-named carrier, a plunger for ejecting said blanks lengthwise through said slots and said channel into said radial grooves with the butt ends of the blanks projecting beyond the edge of said grooved carrier, said channel having an opening at one side to permit said butt ends to pass laterally out of the same, and a yieldable gate applied to the side opening of said channel.

8. In a horse-nail machine, the combination of a rotary carrier having radial slots to receive nail blanks, a second rotary carrier having radial grooves for the blanks, a guide-channel for the blanks leading from the first to the second-named carrier, a plunger for ejecting said blanks lengthwise through said slots and said channel into said radial grooves with the butt ends of the blanks projecting beyond the edge of said grooved carrier, said channel having an opening at one side to permit said butt ends to pass laterally out of the same, and a yieldable gate applied to the side opening of said channel, said gate and the opposing wall of the guide-channel converging toward the second-named carrier to frictionally stop the projected blanks at a predetermined point.

GUSTAV W. LANGE.
GUSTAV M. LANGE.